Patented July 24, 1928.

1,678,084

UNITED STATES PATENT OFFICE.

WINFIELD SCOTT, OF AKRON, OHIO, ASSIGNOR TO THE RUBBER SERVICE LABORATORIES CO., OF AKRON, OHIO, A CORPORATION OF OHIO.

PROCESS OF PRODUCING VULCANIZED RUBBER.

No Drawing. Original application filed September 9, 1925, Serial No. 55,386. Divided and this application filed May 19, 1926. Serial No. 110,294.

The present invention is directed to the art of producing vulcanized rubber. The invention is particularly concerned with the manufacture of a vulcanized rubber composition of commercial value and importance by employing as an accelerator of the vulcanization process, a new type of compound for this purpose as is hereinafter fully set forth and described.

It is well known in chemistry that the aldehydes and particularly the aliphatic aldehydes, react with certain types of organic compounds such as the amines and certain amino derivatives and the like to produce new materials known as condensation products. These products are commonly termed Schiff's bases. Not only do aldehydes react in this manner with the primary amino compounds, but they will likewise combine or condense with the secondary amines of the alkyl, aryl and cyclic series.

In United States Patent No. 1,586,121, granted May 25, 1926, there was claimed a process of manufacturing vulcanized rubber by employing as a vulcanization accelerator, a compound produced by reacting carbon bisulfid upon the reaction product of a secondary amine, particularly a secondary cyclic amine such as piperidine, with an aldehyde, such as formaldehyde. The present application is a division of this earlier application referred to, and is directed particularly to the use, as a rubber vulcanization accelerator, of the carbon bisulfid derivative of the reaction product of a secondary amine, preferably of the alkyl or aryl series, with an aldehyde. A closely related type of reaction product wherein an unsaturated aldehyde is employed in the manufacture of the accelerators set forth, is described and claimed in a copending application, Serial No. 110,295, filed May 19, 1926.

One method whereby a compound of the type mentioned may be manufactured is as follows. Two molecular proportions of a straight chain secondary amine, for example, di-ethyl-amine is reacted with one molecular proportion of an aldehyde such as paraformaldehyde, or a like material. This reaction may be carried out with or without the use of a solvent as desired but it is desirable, in any event that the mixture be kept from becoming too hot as the product formed and the ingredients employed are comparatively low boiling. The product, which in the case of the substances particularly mentioned is probably tetra-ethyl-di-amino-methane, is a liquid and is slightly soluble in the water separating from the reaction mixture. To the product obtained as described, there is added one molecular proportion of carbon bisulfid. This reaction also may be carried out with or without the use of a solvent as described, but if no solvent be used, the mixture should preferably be maintained at a temperature below the boiling point of the product formed and of the substances taken. Other proportions of the various ingredients than those particularly mentioned may, of course, be employed.

In a similar manner, other analogous compounds may be prepared. Thus, two molecular proportions of a secondary aryl amine, such as di-benzyl-amine dissolved in any suitable solvent or not as desired may be reacted with one molecular proportion of paraformaldehyde or a like material. A white crystalline product melting at substantially 99° C. results. This product may be dissolved in a suitable solvent, such as ether, and combined with an equal molecular proportion of carbon bisulfid, whereupon there is obtained a product which, upon recrystallization from ligroin, melts at approximately 64° C. The carbon bisulfid derivative of the reaction product of other secondary amines and aldehydes may be prepared in an analogous manner.

Broadly then, the carbon bisulfid reaction product of the condensation product of other secondary amines, and particularly of other cyclic amines preferably containing a nitrogen atom in the ring, with aldehydes may be prepared in a similar manner. Thus, in place of piperidine mentioned, di-ethylene-di-amine, pyrollidine, piperazine, hydroquinoline, alkyl derivatives such as α- or β-piperidine, the alkyl derivatives of cyclic amines, tetra-hydro-quinaldine, the dialkyl-amines such as di-ethyl-amine, and di-benzyl-amine and other secondary aliphatic and aromatic amines as well as hydro-collidine and other compounds present in commercial pyridine may be used. These various compounds and other related materials may be combined in the proportions stated or in other proportions if desired, with aldehydes such as formaldehyde, or acetaldehyde and their polymeric forms, or with propionaldehyde, butraldehyde, iso-valeric aldehyde, heptaldehyde and other aliphatic aldehydes, with acrolein or crotonaldehyde or other unsaturated aldehydes, with oxy-aldehydes such as aldol, or with aromatic aldehydes such as benzaldehyde, cinnamic aldehyde and the like or with ring compounds such as furfuraldehyde, and the product reacted with carbon bisulfid in the manner as described.

All of the substances comprising my preferred type of compounds as hereinbefore described and particularly the carbon bisulfid derivative of the reaction product of di-ethyl-amine or di-benzyl-amine or the like with an aldehyde may be used as accelerating agents of the vulcanization of rubber. The accelerators hereinbefore mentioned are rapid in their action and may be used advantageously in such compounds as the so called cold cure cements. The accelerators likewise may be employed in heat cured rubber goods as is shown by the following example. A rubber composition intended for use as a friction stock for a tire comprises 100 parts of pale crepe rubber, 5 parts of zinc oxide, 2.5 parts of sulphur, and 0.2 parts of one of my new accelerators of the class described, for example, the carbon bisulfid derivative of the reaction product of di-benzyl-amine and formaldehyde or a polymer thereof.

The above composition may be readily prepared in the usual and well known manner by plasticizing or breaking down rubber on the differential mixing mills and then incorporating homogeneously therein, the filler, the vulcanizing agent and the accelerator. The composition is then cured by heating under pressure in molds for a period of time necessary to give a commercial vulcanized product depending upon the pressure employed. It has been found in the case of the mixture described, that a commercial vulcanized product is produced after heating in the manner as specified for approximately one hour at a temperature of about 240° F. which is substantially that given by ten pounds of steam pressure per square inch.

An equally good vulcanized rubber may be produced by incorporating 0.2 parts of the carbon bisulfid derivative of the reaction product of di-ethyl-amine with paraformaldehyde, into a rubber mix comprising 100 parts of rubber, 5 parts of zinc oxide, and 2.5 parts of sulphur and heating the resulting composition in a press at a temperature of approximately 240° F. for a period of about one hour. A vulcanized product results which upon testing is found to possess a tensile strength of about 3355 pounds per square inch and an ultimate elongation of about 795%. Vulcanization temperatures other than the one particularly mentioned in the examples given may be employed if desired. I have found that the rubber compositions prepared by means of my preferred type of compounds as accelerators may, for example, be completely vulcanized by heating for approximately fifteen minutes at the temperature given by forty pounds of steam pressure per square inch or after heating for approximately three hours at the temperature given by a steam pressure of approximately five pounds per square inch. A vulcanized rubber of high quality results from the use of my new type of accelerators under the varying curing conditions mentioned.

Other rubber compositions may likewise be prepared by employing any of my new type of accelerators. Thus, a semi-translucent stock that may be used in the manufacture of druggist sundries, such as hot water bottles, nipples, etc., may be prepared from a mixture comprising 100 parts of pale crepe rubber, 0.5 parts of zinc oxide, 1.5 parts of sulphur and 0.5 parts of one of my new accelerators of the type set forth herein. This mixture will yield a commercial product when vulcanized for approximately twenty-five minutes under the pressure of approximately twenty pounds of steam per square inch.

The accelerators as herein described may likewise be employed in the manufacture of a hard rubber. Thus, for example, 100 parts of pale crepe rubber, 150 parts of zinc sulfid, 5 parts of zinc oxide, 70 parts of sulphur and 2 parts of any of my preferred class of accelerators may be mixed together in the usual manner and cured for a period of approximately one hour and forty-five minutes at a pressure of 40 pounds of steam per square inch. A bright red hard rubber of high quality may be obtained by incorporating into the above composition substantially 20 parts of a suitable coloring material, such as a naphthalamine color. Other dyes may, of course, be used if desired.

The accelerators herein described are sufficiently rapid in their action to produce a cure in a cement composition. Thus, a mixture of 100 parts of pale crepe rubber, 3.5 parts of sulphur, 5 parts of zinc oxide and 0.5 parts of accelerator will produce a cement which will cure at room temperature upon standing for a suitable period of time. Other uses of my preferred type of accelerator are apparent from the examples hereinbefore described.

It is to be understood that my invention is not limited by any theory set forth in explanation of the facts involved nor are the examples given to be considered as limitative of my invention. For example, it is within the scope of my invention, when my preferred compounds are used in the acceleration of a so called cold cure or rubber cement, that instead of using the accelerators in the form as disclosed, I may use the reaction product of the aldehyde and the imino compound and add this compound to a rubber compound wherein carbon bi-sulfid is present in or is used as the carrier liquid in the cement. By such a process, my new class of compounds are formed in situ and exert their accelerating powers as formed. Other means of using the accelerators herein described are apparent to those skilled in the art. It is, of course, possible to use other types of rubber than that mentioned in the examples while other fillers may be employed together with or in place of zinc oxide. My invention is, then to be regarded as defined solely by the claims hereinafter set forth wherein I intend to claim all novelty permissible in view of the prior art.

What I claim is:

1. The process of manufacturing vulcanized rubber which comprises heating rubber and sulphur in the presence of the carbon bisulfid derivative of the reaction product of a straight chain disubstituted organic ammonia derivative with an aldehyde.

2. The process of manufacturing vulcanized rubber which comprises heating rubber and sulphur in the presence of the carbon bisulfid derivative of the reaction product of a straight chain secondary amine with an aldehyde.

3. The process of manufacturing vulcanized rubber which comprises heating rubber and sulphur in the presence of the carbon bisulfid derivative of the reaction product of an aliphatic straight chain secondary amine with an aldehyde.

4. The process of manufacturing vulcanized rubber which comprises heating rubber and sulphur in the presence of the carbon bisulfid derivative of the reaction product of an aliphatic straight chain secondary amine with an aliphatic aldehyde.

5. The process of manufacturing vulcanized rubber which comprises heating rubber and sulphur in the presence of the carbon bisulfid derivative of the reaction product of di-ethyl amine with an aliphatic aldehyde.

6. The process of manufacturing vulcanized rubber which comprises heating rubber and sulphur in the presence of the carbon bisulfid derivative of the reaction product of di-ethyl amine with paraformaldehyde.

7. The process of manufacturing vulcanized rubber which comprises heating rubber and sulphur in the presence of the compound obtained by reacting substantially one molecular proportion of carbon bisulfid upon the reaction product of two molecular proportions of di-ethyl amine with one molecular proportion of paraformaldehyde.

8. The vulcanized rubber product obtained by heating rubber and a vulcanizing agent in the presence of the carbon bisulfid derivative of the reaction product of a straight chain di-substituted organic ammonia derivative with an aldehyde.

9. The vulcanized rubber product obtained by heating rubber and a vulcanizing agent in the presence of the carbon bisulfid derivative of the reaction product of a straight chain secondary amine with an aldehyde.

10. The vulcanized rubber product obtained by heating rubber and a vulcanizing agent in the presence of the carbon bisulfid derivative of the reaction product of an aliphatic straight chain secondary amine with an aldehyde.

11. The vulcanized rubber product obtained by heating rubber and a vulcanizing agent in the presence of the carbon bisulfid derivative of the reaction product of an aliphatic straight chain secondary amine with an aliphatic aldehyde.

12. The vulcanized rubber product obtained by heating rubber and a vulcanizing agent in the presence of the carbon bisulfid derivative of the reaction product of di-ethyl amine with an aliphatic aldehyde.

13. The vulcanized rubber product obtained by heating rubber and a vulcanizing agent in the presence of the carbon bisulfid derivative of the reaction product of di-ethyl amine with paraformaldehyde.

14. The vulcanized rubber product obtained by heating rubber and a vulcanizing agent in the presence of the compound obtained by reacting substantially one molecular proportion of carbon bisulfid upon the reaction product of two molecular proportions of di-ethyl amine with one molecular proportion of paraformaldehyde.

Signed at Akron, in the county of Summit, and State of Ohio, this 14th day of May, A. D. 1926.

WINFIELD SCOTT.